United States Patent [19]
Golla et al.

[11] Patent Number: 5,794,024
[45] Date of Patent: Aug. 11, 1998

[54] METHOD AND SYSTEM FOR DYNAMICALLY RECOVERING A REGISTER-ADDRESS-TABLE UPON OCCURRENCE OF AN INTERRUPT OR BRANCH MISPREDICTION

[75] Inventors: Robert Thaddeus Golla, Plano; Thomas Alan Hoy, Austin; Christopher Hans Olson, Austin; Terence Matthew Potter, Austin; Thomas Luther Thomas, Jr., Austin, all of Tex.

[73] Assignee: International Business Machines Corporation, Armonk, N.Y.

[21] Appl. No.: 621,552

[22] Filed: Mar. 25, 1996

[51] Int. Cl.$^6$ ............................................. G06F 9/30
[52] U.S. Cl. .................................. 395/569; 395/393
[58] Field of Search ............................. 395/393, 569

[56] References Cited

U.S. PATENT DOCUMENTS

| | | |
|---|---|---|
| 4,200,927 | 4/1980 | Hughes et al. . |
| 4,370,711 | 1/1983 | Smith . |
| 4,477,872 | 10/1984 | Losq et al. . |
| 4,679,141 | 7/1987 | Pomerene et al. . |
| 4,691,277 | 9/1987 | Kronstadt et al. . |
| 4,763,245 | 8/1988 | Emma et al. . |
| 4,764,861 | 8/1988 | Shibuya . |
| 4,777,594 | 10/1988 | Jones et al. . |
| 4,901,233 | 2/1990 | Liptay . |
| 4,943,908 | 7/1990 | Emma et al. . |
| 5,134,561 | 7/1992 | Liptay . |
| 5,197,132 | 3/1993 | Steely, Jr. et al. ............... 395/393 |
| 5,210,831 | 5/1993 | Emma et al. ............... 395/375 |
| 5,276,882 | 1/1994 | Emma et al. ............... 395/700 |
| 5,333,283 | 7/1994 | Emma et al. ............... 395/375 |
| 5,355,457 | 10/1994 | Shebanow et al. ............... 395/393 |
| 5,404,467 | 4/1995 | Saba et al. ............... 395/375 |
| 5,586,278 | 12/1996 | Papworth et al. ............... 395/582 |

OTHER PUBLICATIONS

IBM Technical Disclosure Bulletin, Conditional Execution in a Register Management Scheme for Out of Sequence Execution vol. 34 No. 10A, Mar. 1992; pp. 449-454.

*Primary Examiner*—Richard L. Ellis
*Attorney, Agent, or Firm*—Sawyer & Associates; Casimer K. Salys

[57] ABSTRACT

A method and system for dynamically recovering a lookahead register-address-table (RAT) in a processor that executes program instructions. Each instruction that updates a logical register address is assigned to a different physical register address. Each of the instructions to be processed by the processor are stored in a fifo queue. The physical register address assignments for each of the instructions are stored in a first RAT, and information regarding instructions that have completed execution by the processor are stored in a second RAT. The method and system further comprises storing the physical register address assignments for non-branch instructions from the fifo queue in a recovery RAT. The first RAT is then restored after an interrupt occurs by copying the second RAT into the recovery RAT and then copying the recovery RAT into the first RAT. The first RAT is restored after a mispredicted branch instruction has been executed by copying the recovery RAT into the first RAT, whereby the first RAT is restored without storing multiple snapshots.

15 Claims, 3 Drawing Sheets

METHOD AND SYSTEM FOR DYNAMICALLY RECOVERING A REGISTER-ADDRESS-TABLE UPON OCCURRENCE OF AN INTERRUPT OR BRANCH MISPREDICTION

FIELD OF THE INVENTION

The present invention relates to a method and system for improving the performance of a processor and more particularly to a method and system for dynamically recovering a register address table.

BACKGROUND OF THE INVENTION

Conventional processors today are capable of executing multiple software instructions at once. Each instruction typically specifies the type of operation that the processor is to perform on source and target operands in the instruction. The source and target operands are typically stored in and retrieved from a set of general purpose registers (GPRs). GPRs are typically identified in program instructions. For example, the instruction "ADD r2, r3, r4" instructs the processor to add the contents of registers r3 and r4 and write the result to register r2. The GPR identifiers (e.g., r2, r3, r4) are called logical register numbers or logical register addresses.

Each GPR may be used by several instructions. For instance, prior instructions may write to registers r3 and r4 that are read by the ADD instruction, and other instructions may also write to register r2. Therefore, conventional processors assign unique physical registers, referred to as rename registers, to each instance of a GPR or logical register to allow multiple instructions which update the same logical register to execute simultaneously or out-of-order. Every instruction that writes to a GPR is assigned to a different physical register address from an existing free pool of physical register addresses. The assignment between logical register addresses and physical register addresses is stored in what is referred to as a lookahead register-address-table (RAT), also called a rename map.

Subsequent instructions that use a given instance of a GPR in a source context read the lookahead RAT to determine which physical register to read. Once a physical register is associated with an instance of a GPR, that physical register cannot be freed until the instance of that GPR is no longer needed. This occurs when all instructions which use the same instance of the GPR as a source have obtained the source data they need, or when the instruction which generates a particular GPR instance is purged from the processor.

Most processor instruction sets include branch instructions, which cause a program's execution to continue at a target address specified in the instruction. Branch instructions are executed either unconditionally or conditionally. If the transfer of control to the target address is dependent upon the results of a previous instruction, such as a compare, for example, then the branch is referred to as a conditional branch.

Conditional branches may be either resolved or unresolved depending on whether the result of the previous instruction is known at the time of the execution of the branch. If the branch is resolved, then it is known whether the branch is to be executed. If the conditional branch is not executed, the next sequential instruction stream immediately following the branch instruction is executed. If the conditional branch is executed, then the instruction stream starting at the target address is executed.

Since it is unknown whether an unresolved branch is to be executed, it is also unknown which instruction stream should be processed. In order to prevent the processor from stalling pending resolution of the unresolved branch, some processors include mechanisms that attempt to predict the outcomes of unresolved branches. Until the outcome of the condition is actually known and the result becomes committed by the processor, the prediction is only speculative. The execution of the predicted instruction stream or path is therefore called speculative execution.

The execution of a speculative stream of instructions updates the lookahead RAT just as a normal stream. If the branch was mispredicted, then the assignments in the lookahead RAT are incorrect and the prior state of the lookahead RAT needs to be recovered.

A conventional method for recovering the state of the lookahead RAT is to store a copy, called a snapshot, of the lookahead RAT every time an unresolved branch is encountered. If the branch was mispredicted, then the snapshot is copied back into the lookahead RAT to recover the state of the lookahead RAT prior to the execution of the mispredicted branch.

As stated above, one snapshot of the lookahead RAT is required for every unresolved branch. Since each snapshot is large and expensive, this approach is not well suited for some pipelined processor designs where many unresolved branches may be processed at the same time.

Accordingly, what is needed is an improved mechanism for recovering the proper state of a register address table. The present invention addresses such a need.

SUMMARY OF THE INVENTION

The present invention is a method and system for dynamically recovering a lookahead register-address-table (RAT) in a processor that executes program instructions. Each instruction that updates a logical register address is assigned to a different physical register address. Each of the instructions to be processed by the processor are stored in a fifo queue. The physical register address assignments for each of the instructions are stored in a first RAT, and information regarding instructions that have completed execution by the processor are stored in a second RAT. The method and system further comprises storing the physical register address assignments for non-branch instructions from the fifo queue in a recovery RAT. The first RAT is then restored after an interrupt occurs by copying the second RAT into the recovery RAT and then copying the recovery RAT into the first RAT. The first RAT is restored after a mispredicted branch instruction has been executed by copying the recovery RAT into the first RAT, whereby the first RAT is restored without storing multiple snapshots.

According to the system and method disclosed herein, the present invention allows and arbitrary number of speculative streams resulting from predicted branch instructions to exist past dispatch with fixed cost hardware; the fifo queue and the recovery RAT, thereby increasing overall system performance.

DESCRIPTION OF THE INVENTION

The present invention relates to an improvement in recovering the state of a processor after a mispredicted branch or interrupt. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
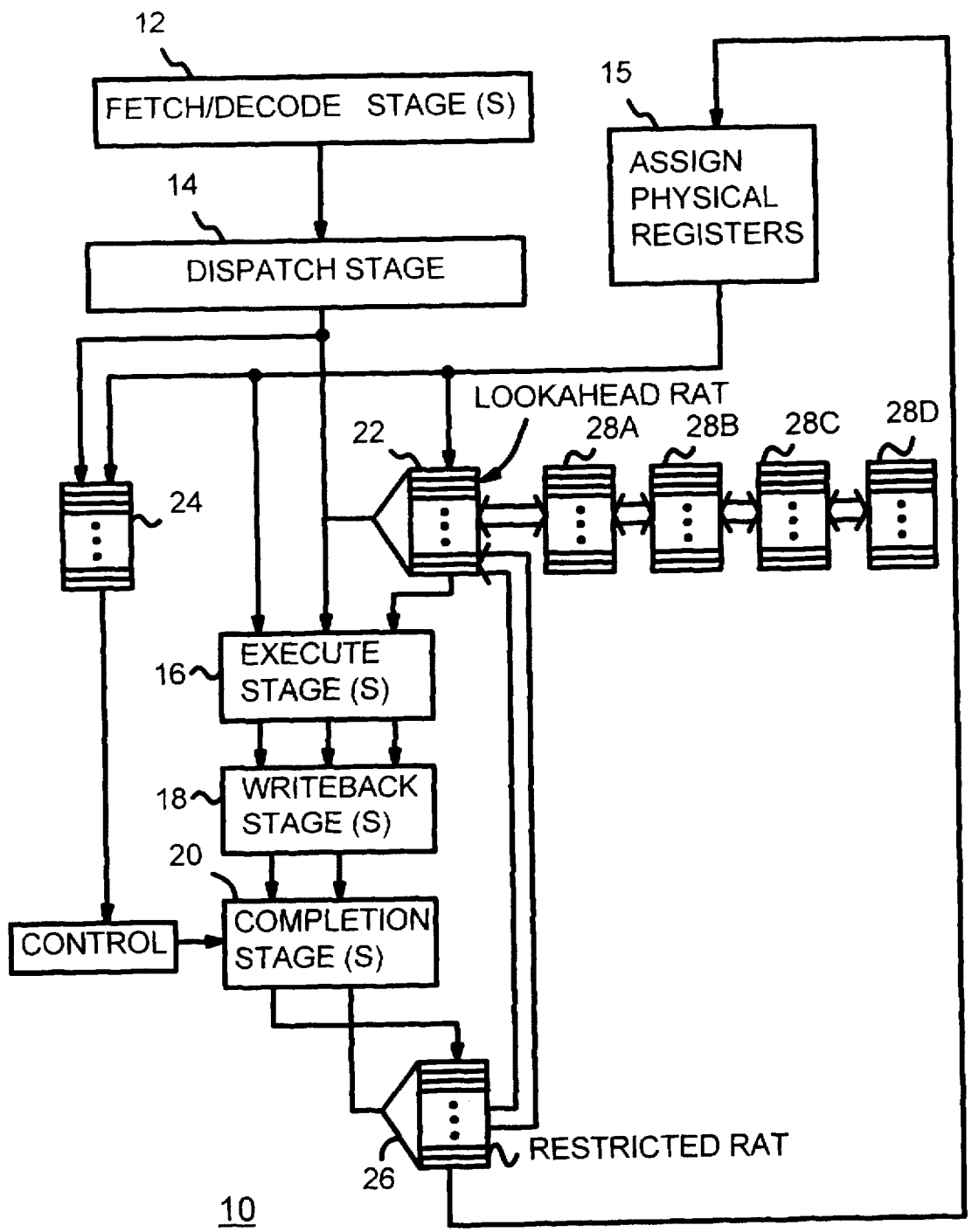
FIG. 1 is a functional block diagram of a prior art processor.

FIG. 1 is a functional block diagram of a prior art processor. The processor 10 includes five stages: a fetch/decode stage 12, a dispatch stage 14, an execute stage 16, a writeback stage 18, and a completion stage 20. The processor 10 also includes a lookahead register-address-table (RAT) 22, a completion buffer 24, and an architected RAT 26.

In operation, instructions are fetched from memory and decoded in the fetch/decode stage 12. In the dispatch stage 14, instructions are dispatched to execution units, which operate in the execute stage 16. At the same time, the instructions specifying the same target GPR are assigned to different physical registers in block 15. In a preferred embodiment, each instruction is assigned to a physical register using unique physical register addresses.

The assignment between a target GPR in an instruction and a physical register address is stored in the lookahead RAT 22. Subsequent instructions that use GPRs in a source context read the lookahead RAT 22 to determine which physical register to read.

In the execute stage 16, execution units perform the operation specified in each instruction and generate the result. In the writeback stage 18, the results from the execution stage 16 are written into the physical registers that were assigned to each instruction.

In the completion stage 20, the results are committed to the processor state. To facilitate the completion stage 20, the completion buffer 24 is used to keep track of the outstanding instructions from the dispatch stage 14 and to maintain the architectural state of the processor 10. Once an instruction, such as branch, has been fully executed, the instruction is committed and removed from the bottom of the completion buffer 24.

The architected RAT 26 maintains the correct architectural mappings between the architected and physical registers. When instructions are committed by the completion buffer 24, the values in the architected RAT 26 are updated. Beyond the completion stage 20, instructions cannot be purged from the processor 10.

During the dispatch stage 14, when an unresolved branch instruction is encountered, the contents of the lookahead RAT 22 are stored in a snapshot 28. Multiple snapshots 28A, 28B, 28C, and 28D are stored for multiple outstanding unresolved branch instructions. When a mispredicted branch path has been executed, the corresponding snapshot 28 is copied back into the lookahead RAT 42.

Although snapshots 28 recover the lookahead state, the snapshot approach requires the processor 10 to potentially update multiple snapshots 28 during the dispatch stage 14 of a given cycle due to unresolved branches, which complicates processor design. Furthermore, maintaining multiple snapshots 28 waste processor resources and increases the overall cost of the processor 10.

The present invention dispenses with the need for multiple snapshots by dynamically rebuilding the lookahead RAT from the architected state when a branch is mispredicted. To more particularly describe the system and method of the present invention, refer now to FIG. 2.

Figure 2:
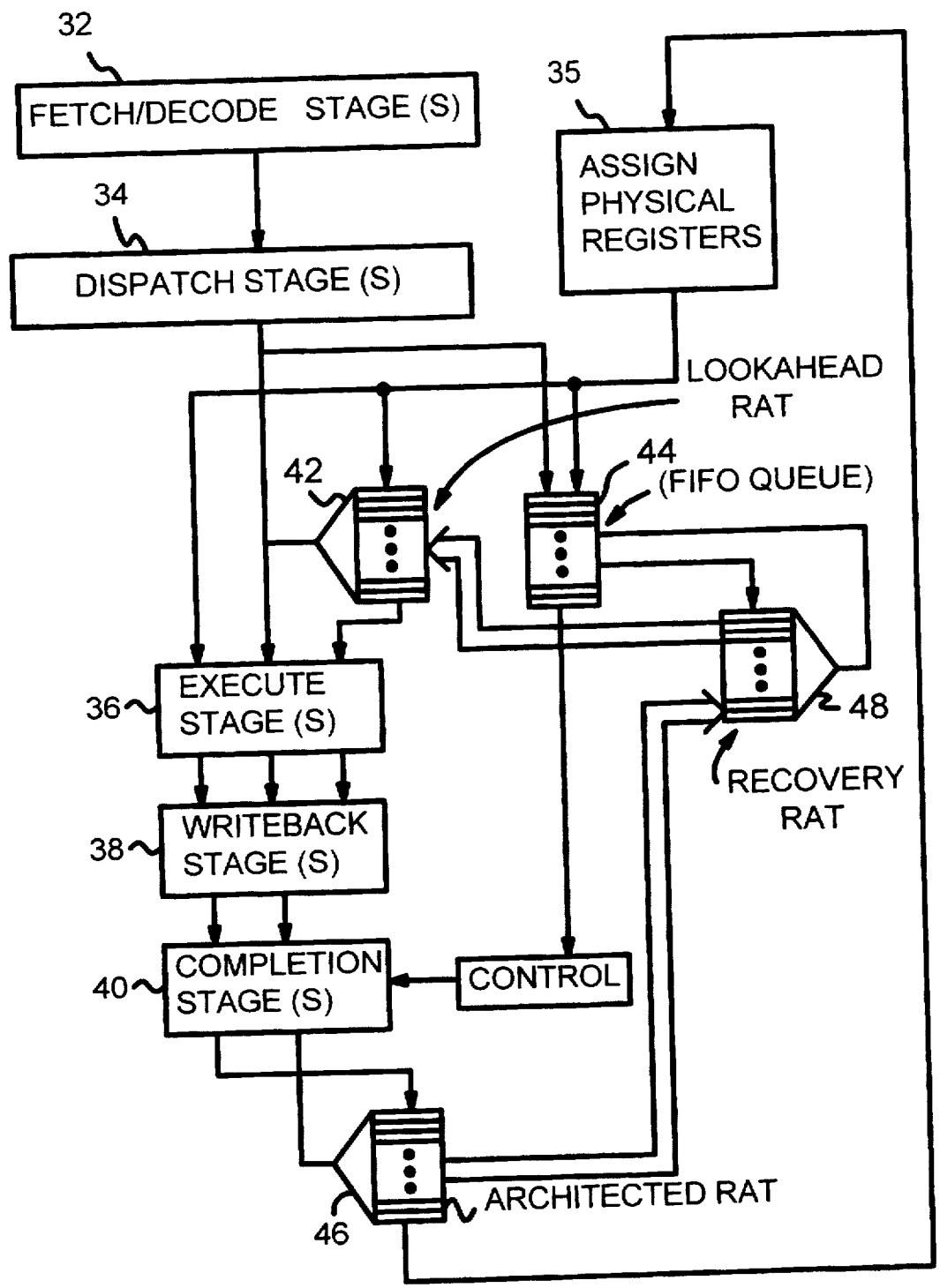
FIG. 2 is a functional block diagram of a processor in accordance with the present invention.

FIG. 2 is a functional block diagram of a processor in accordance with the present invention. The processor 30 includes the five stages shown in FIG. 1: a fetch/decode stage 32, a dispatch stage 34, an execute stage 36, a writeback stage 38, and a completion stage 40.

The processor 30 also includes a lookahead RAT 42, an architected RAT 46, and a fifo queue 44. In a preferred embodiment, the fifo queue 44 is the processor's completion buffer, but any type of fifo queue structure is sufficient.

Instead of multiple snapshots to recover the state of the lookahead RAT 42, the present invention utilizes only one additional RAT, referred to as a recovery RAT 48, and builds the snapshots dynamically. The recovery RAT 48 represents a state between the lookahead state and the architected state. Snapshots are built dynamically using a combination of the recovery RAT 48, the architected RAT 46, and the fifo queue 44. The fifo queue 44 allows hardware to handle an arbitrary number of unresolved branches without requiring an excessive amount of hardware (e.g. snapshots) to recover from mispredicted branches.

In operation during the dispatch stage 34, every instruction that writes to a GPR is copied into both the fifo queue 44 and the lookahead RAT 42 via lines 37 and 39. Each entry in the fifo queue 44 contains the following information: 1) the architected target register address; 2) the physical target register address: 3) a finished bit: and 4) a valid bit. The finished bit is set when an instruction is executed. For conditional branches, the finished bit is set when the branch is resolved.

In a preferred embodiment, the processor 30 includes a mechanism (not shown) that can detect and correctly respond to interrupts. Although the details of this mechanism are outside the scope of this description, the mechanism may, but is not required, to share hardware with the dynamic lookahead RAT recovery mechanism of the present invention.

In the preferred embodiment, both the interrupt handling mechanism and the dynamic lookahead RAT recovery mechanism use a common FIFO queue 44 containing all instructions in program order. For the interrupt handling mechanism, the FIFO queue 44 need only contain interruptable instructions and unresolved conditional branches. For the lookahead RAT recovery mechanism, the FIFO queue 44 need only contain all instructions which update GPRs and unresolved conditional branches.

In a preferred embodiment, the processor 30 examines instructions in the FIFO queue 44 in-order from oldest to newest when updating the recovery RAT (RRAT) 48. The initial state, the processor 30 examines the oldest instruction in the machine.

Figure 3:
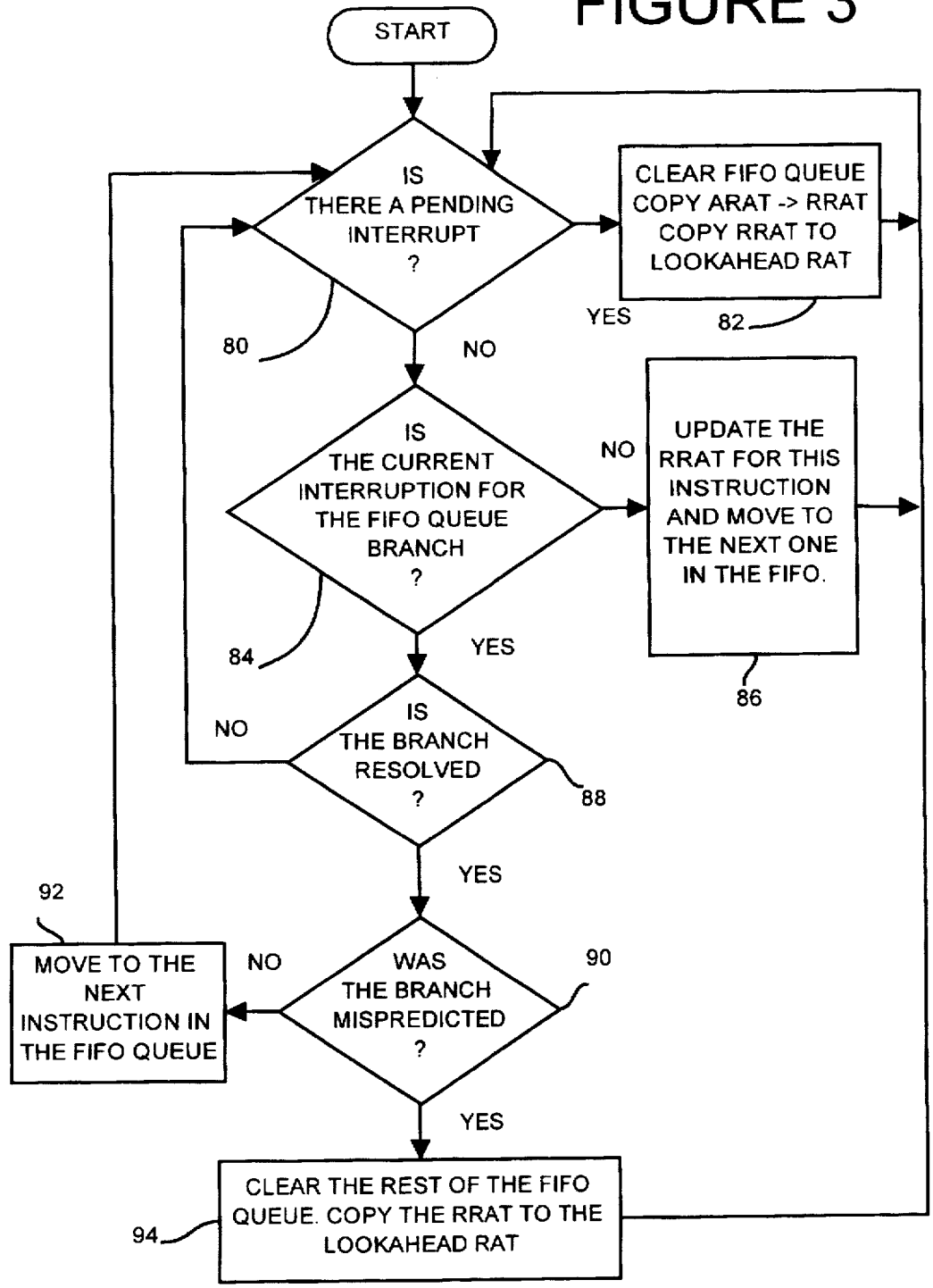
FIG. 3 illustrates a flow chart of the dynamic recovery of a lookahead RAT in accordance with the present invention.

FIG. 3 illustrates a flow chart of the dynamic recovery of a lookahead RAT in accordance with the present invention. Referring to both FIGS. 2 and 3, the first step 80 in the process is to check for pending interrupts. The mechanism in the processor 30 for detecting interrupts informs the lookahead RAT (LRAT) recovery mechanism when an interrupt occurs.

If an interrupt is pending, then the FIFO queue 44 is cleared, the architected RAT (ARAT) 46 is copied to the RRAT 48, which is then copied to the LRAT 42, all via step 82. Thus the LRAT 42 has recovered from an interrupt. The process then returns to step 80.

If an interrupt is not pending in step 80, then the processor checks the current instruction for the current processor cycle to determine if the instruction is a branch instruction in step 84. If the current instruction is not a branch instruction, then the RRAT 48 is updated for that instruction (if the instruction uses a GPR in a target context), and the processor advances to the next instruction in the FIFO queue 44 in step 86. The process then returns to step 80.

If the current instruction is a branch instruction in step 84, then in step 88, it is checked to determine if it is resolved. In this embodiment, this is done by examining the finished bit corresponding to that instruction; 1 means resolved, 0 means not resolved. If the finished bit indicates that the branch is not finished, then the process must wait for the branch to finish before advancing to a next instruction in the fifo queue, and the process returns to step 80.

If the branch is resolved, then the branch is checked to determine if it resolved as predicted, or was predicted incorrectly in step 90. If the branch was predicted incorrectly, then a misprediction has occurred and the process proceeds to step 94 where the FIFO queue 44 is cleared above the current instruction (i.e., all instructions which are newer than the branch are removed from the queue), and the RRAT 48 is copied to the LRAT 42. The process then returns to step 80. Thus, the LRAT 42 has been restored after a mispredicted branch.

If the branch has not mispredicted in step 90, then the process proceeds to step 92 where the processor advances to the next instruction in the FIFO queue 44, and the process returns to step 80.

In the embodiment described above, branch instructions must resolve in order. In processors which must wait until a branch reaches the bottom of the FIFO queue 44 in order to respond to a misprediction, the maximum waiting time could be a large number of cycles. Simulations have shown, however, that the less strict requirement of processor 30, that branches resolve in-order (from anywhere in the FIFO queue 44), rarely causes a delay of 1 cycle or more. In any processor with two pipe stages before dispatch (e.g. fetch and decode in the processor 30), only a waiting time greater than one cycle can cause an interruption in the dispatch of instructions.

A dynamic recovery system and method has been disclosed. The method and system allows an arbitrary number of speculative streams to exist past dispatch with fixed cost hardware, the fifo queue and the recovery RAT. Simulations have shown that the ability to handle multiple speculative streams in deep pipelines is important to obtain reasonable performance. For example, restricting the number of speculative streams to two in a five deep pipeline can reduce overall system performance by more than ten percent. Furthermore, the scheme disclosed here requires that only one register-address-table be updated during the dispatch stage of a given cycle. Updating multiple register-address-tables (snapshots) as in prior methods is not desirable in high-frequency microprocessor designs.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for dynamically recovering a lookahead register-address-table (RAT) in a processor that executes program instructions, such that instructions updating a local register address are assigned to a different physical register address, wherein instructions to be processed by the processor are stored in a queue, the physical register address assignments for each of the instructions are stored in a first RAT, and information regarding instructions that have been executed by the processor are stored in a second RAT, the method comprising the steps of:

(a) storing the physical register address assignments for non-branch instructions from the queue into a recovery RAT, the recovery RAT being updated for the non-branch instructions having physical register assignments;

(b) restoring the first RAT in response to an interrupt by copying the second RAT into the recovery RAT and then copying the recovery RAT into the fist RAT; and (c) restoring the first RAT in response to an executed mispredicted branch instruction by copying the recovery RAT into the first RAT.

2. A method as in claim 1 wherein step (b) further includes the steps of:

(b1) clearing instructions in the queue that are located above the current instruction in the queue; and (b2) advancing to the next instruction in the queue.

3. A method as in claim 2 wherein step (c) further includes the step of:

(c1) clearing instructions in the queue that are located above the current instruction in the queue; and (c2) advancing to the next instruction in the queue.

4. A method as in claim 3 wherein the queue is a completion buffer, the first RAT is a lookahead RAT, and the second RAT is an architected RAT.

5. A method as in claim 4 wherein step (a) further includes the step of:

(a3) for an assignment between a first instruction and a first physical register address, providing the queue with a logical register address, the address of the first physical register, and a finished bit, wherein the finished bit indicates whether the first instruction has executed.

6. A system for dynamically recovering a lookahead register-address-table (RAT) in a processor that executes program instructions, such that instructions updating a logical register address are assigned to a different physical register address, the system comprising:

a queue for storing instructions to be processed by the processor;

a lookahead RAT for storing the physical register address assignments for each of the instructions;

an architected RAT for storing information regarding instructions that have completed execution by the processor; and a recovery RAT coupled to the queue, to the lookahead RAT, and to the architected RAT for storing the physical register address assignments for non-branch instructions from the queue, the recovery RAT being updated for the non-branch instructions having physical register assignments, wherein in response to an interrupt, the processor restores the lookahead RAT by copying the architected RAT into the recovery RAT and then copying the recovery RAT into the lookahead RAT, and in response to an executed mispredicted branch instruction, the processor restores the lookahead RAT by copying the recovery RAT into the lookahead RAT.

7. A system as in claim 6 wherein the queue includes a plurality of entries and each entry includes an logical register address field, a physical register address field, and a finished bit.

8. A system as in claim 7 wherein the finished bit indicates whether the instruction in each of the entries has been executed.

9. A method for dynamically recovering a lookahead register-address-table in a processor that executes program instructions, such that instructions updating a logical register address are assigned to a different physical register, the method comprising the steps of:

(a) storing instructions to be processed by the processor into a queue, wherein the instruction currently being processed by the processor is the current instructions;

(b) storing the physical register address assignments for each of the instructions into a first RAT;

(c) storing information regarding instructions that have completed execution by the processor into a second RAT;

(d) storing the physical register address assignments for non-branch instructions from the queue into a recovery RAT, the recovery RAT being updated for the non-branch instructions having physical register assignments, (e) restoring the first RAT in response to an interrupt by copying the second RAT into the recovery RAT and then copying the recovery RAT into the first RAT; and (f) restoring the first RAT in response to an executed mispredicted branch instruction by copying the recovery RAT into the first RAT.

10. A method as in claim 9 wherein step (e) further includes the steps of:

(e1) clearing instructions in the queue that are located above the current instruction in the queue; and (e2) advancing to the next instruction in the queue.

11. A method as in claim 10 wherein step (f) further includes the step of:

(f1) clearing instructions in the queue that are located above the current instruction in the queue; and (f2) advancing to the next instruction in the queue.

12. A method for dynamically recovering a lookahead register-address-table (RAT) in a processor, the processor including a general purpose register and a plurality of physical registers, the method comprising the steps of:

(a) dispatching instructions for execution;

(b) storing information regarding each of the instructions into a first-in-first-out (fifo) queue;

(c) assigning each of the instruction that write to the general purpose register to a different physical register;

(d) storing the physical register address assignments for each of the instructions into a lookahead RAT;

(e) removing non-branch instructions from the bottom of the fifo queue in response to a processor cycle and storing the non-branch instructions into a recovery RAT, the recovery RAT being updated for non-branch instructions having physical register assignments;

(f) when instructions complete execution, storing the instructions into an architected RAT;

(g) in response to a mispredicted branch instruction, copying the recovery RAT into the lookahead RAT;

(h) in response to the non-mispredicted branch instruction, advancing to the next instruction in the fifo queue; and (i) in response to an interrupt, copying the architected RAT into the recovery RAT, and copying the contents of the recovery RAT into the lookahead RAT.

13. A method as in claim 12 wherein the fifo queue is a completion buffer.

14. A method as in claim 13 wherein step (d) further includes the step of:

(d1) for an assignment between a first instruction and the general-purpose register, providing the fifo queue with the address of the general-purpose register, the address of the assigned physical register, and a finished bit, wherein the finished bit indicates whether the first instruction has executed.

15. A method as in claim 14 wherein step (g) further includes the steps of:

(g1) examining the finished bit for branch instructions found in the fifo queue, and if the finished bit indicates that the branch has not executed, waiting for the branch to execute before advancing to a next instruction in the fifo queue.

* * * * *